United States Patent [19]
Abramson et al.

[11] 3,754,098
[45] Aug. 21, 1973

[54] ASYNCHRONOUS SAMPLING AND RECONSTRUCTION FOR ASYNCHRONOUS SAMPLE DATA COMMUNICATION SYSTEM

[75] Inventors: Carl N. Abramson; Douglas G. Jones, both of Somerville, N.J.

[73] Assignee: Adaptive Technology, Inc., Piscataway, N.J.

[22] Filed: Oct. 8, 1971

[21] Appl. No.: 187,697

[52] U.S. Cl. .......... 178/69.5 R
[51] Int. Cl. .......... H04j 3/06
[58] Field of Search .......... 179/15 A, 15 BA, 179/15 BS; 178/69.5 R; 325/41, 42

[56] References Cited

UNITED STATES PATENTS

| | | | |
|---|---|---|---|
| 3,010,073 | 11/1961 | Melas | 178/69.5 R |
| 3,404,230 | 10/1968 | Hailey | 178/69.5 R |
| 3,453,594 | 7/1969 | Jarvis | 178/69.5 R |
| 3,394,223 | 7/1968 | Dewitt | 179/15 BA |
| 3,466,397 | 9/1969 | Benowitz | 179/15 BA |

*Primary Examiner*—Ralph D. Blakeslee
*Attorney*—Philip Young et al.

[57] ABSTRACT

A system and method for deriving a decoding rate to be used by a periodic decoder in reconstructing an analog or voice waveform from asynchronously received sample data that was generated at an unknown and possibly changing periodic encoding rate. Sample data representing a particular defining characteristic of a waveform at unknown but substantially uniformly spaced times is received asynchronously at a generally non-uniform rate. The sample data is stored in a buffer memory until used by a periodic decoder to reconstruct the waveform. The rate at which the periodic decoder uses samples to reconstruct the waveform is adjusted in accordance with the number of samples stored in the buffer such that the number of stored samples tends toward a median number.

11 Claims, 3 Drawing Figures

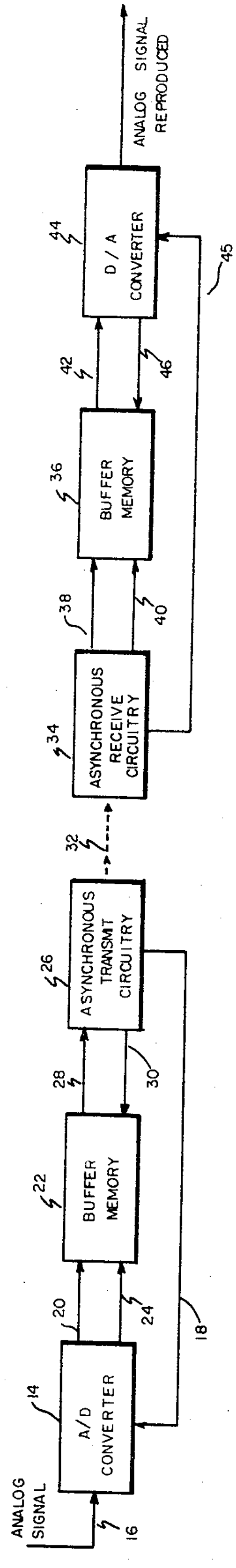
Fig-1 [Prior Art]
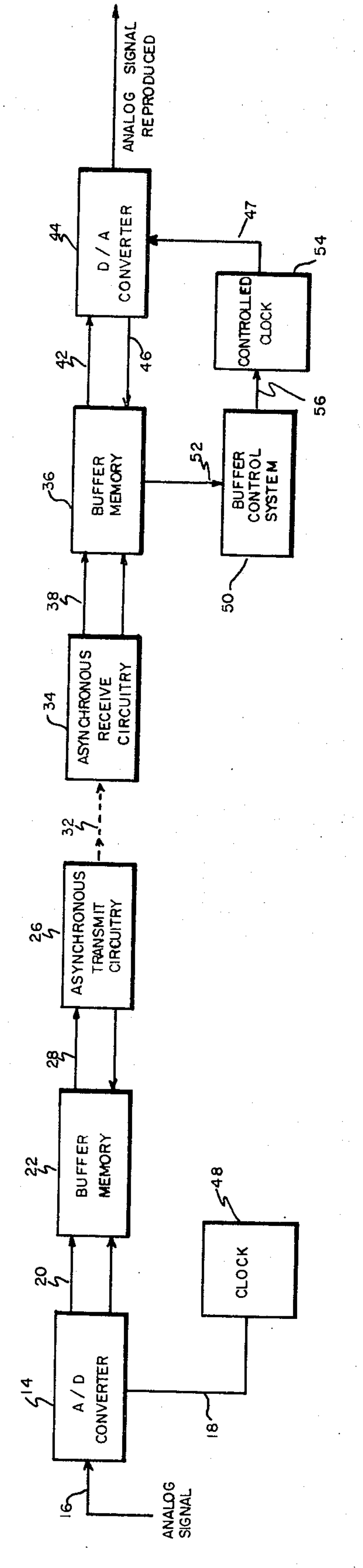
Fig-2

ASYNCHRONOUS SAMPLING AND RECONSTRUCTION FOR ASYNCHRONOUS SAMPLE DATA COMMUNICATION SYSTEM

BACKGROUND OF THE INVENTION

This invention relates to asynchronous sample data communication systems for transferring analog or voice waveforms from one to another of a plurality of stations and more specifically relates to a method and system for independently deriving a decoding rate that approximates an unknown and possibly changing encoding sample rate.

DESCRIPTION OF THE PRIOR ART

Sample data communication systems successively measure the value of a suitable characteristic (such as amplitude) of an analog waveform at suitable (not necessarily uniformly spaced) points in time, transfer the measured values to another station, and there reconstruct the analog waveform from the successive values of the characteristic. This technique is employed so that the successively measured values (samples) may be converted or coded into a form that can be transferred to a receiving station more efficiently and economically than the analog signal itself. At the receiving station a continuous waveform is interpolated from the measured characteristic values, such that the waveform has the measured characterisitc values at the same relative points in time. It is necessary therefore to have the measured values (samples) (1) in the proper order, and (2) properly spaced in time.

In virtually all sample data systems, samples representing a particular waveform are simply maintained in the sequential order they were generated throughout the transmission and reconstruction process, thus eliminating any need for the decoder to rearrange samples. The time spacing problem is inherently eliminated in the many prior art systems that instantaneously transmit samples. That is, a sample is immediately transmitted to its destination station as soon as it is generated and the sample is used by the decoder in reconstructing the waveform as soon as it is received. The time delay experienced by each successive sample is presumed to be the same, thus maintaining the relative time spacing that was used in generating the samples. Time division multiplexed channels are used in virtually all such systems in an effort to achieve a transmission efficiency that justifies sampling. However, a time division multiplex (TDM) system makes the transmission medium briefly available to a station only at specific usually periodically spaced times. Therefore the transmitting station must sample the waveform and transmit the value only at those specific available times. Accordingly, these systems synchronize sampling with the time slot occurrences.

If TDM systems are sought to be connected together, the time slot repetition rates of the subsystems must be synchronized, resulting in the disadvantageous reliance of subsystems upon each other for channel timing and phasing.

Asynchronous transmission systems generally aim to achieve higher transmission efficiency and greater flexibility than TDM (time division multiplex) systems, but in asynchronous systems the proper spacing of samples by the decoder must be separately assured since the time that lapses between the arrival of successive samples is not generally the same time that lapsed between the successive observations of the characteristic represented by the samples. Prior art systems of this type therefore rate synchronize the encoding and decoding processes. That is, all stations are provided with a common periodic timing base signal which directly triggers or otherwise controls the analog-to-digital (encoding) sample rate and the digital-to-analog (decoding) sample rate so that they are identical. The timing base signals are generally but not necessarily conveyed on the same transmission medium as the samples themselves.

Since each decoder relys upon a transmitted timing signal, connecting such systems together or expanding them into large far reaching systems presents the same problems encountered previously in connecting together time division multiplex systems, namely, the necessity of supplying a timing base signal of precisely the same frequency to many widely separated, remote subsystems and stations, resulting again in the disadvantageous reliance of subsystems upon each other for timing information.

Present commercial systems requiring such central timing base signals to be supplied at the stations are, as a result of this requirement, limited in design flexibility, and the selection or changing of subsystems. A compelling need exists therefore to efficiently eliminate entirely the dependence of sample data subsystems upon receiving external timing signals of any kind.

In copending U. S. Application Ser. No. 169,993, filed on Aug. 9, 1971 by Carl Abramson, et al., there is disclosed a voice or analog communication system wherein increased efficiency is achieved by varying the sample rates in accordance with the minimum sampling requirements of the waveform to be conveyed. Various techniques were suggested for communicating to the receiving station changes in the sample rate used by the transmitting station. A further need exists to allow stations to freely select the most efficient sample rate for encoding without burdening the station and the system with the need to communicate each change in the sample rate to the decoder.

SUMMARY OF THE INVENTION

It is an object of this invention to facilitate the interconnection of separate asynchronous sample data communication systems by eliminating the need for a receiving station to rely upon system timing signals for the purpose of establishing, maintaining or changing a decoding sample rate.

It is another object of this invention to further facilitate the interconnection and efficiency of such systems by eliminating the need for a station in any system to use a decoding sample rate controlled from outside the station itself.

It is another object of this invention to still further facilitate such system interconnections by eliminating the need for a station to directly instruct the receiving station of the sample rate used for encoding or any change in such rate.

It is another object of this invention to permit the use of an encoding rate that is continuously variable.

It is a further object of this invention to facilitate the interconnection of asynchronous sample data communication systems which operate at different, unsynchronized and possibly changing bit rates.

These and other objects, which will become apparent from the detailed disclosure and claims to follow, are achieved by the present invention which provides a method and system for deriving a decoding rate to be used by a periodic decoder in reconstructing an analog or voice waveform in an asynchronous sample data communication system. The system includes encoding means for generating sample data at a substantially periodic sample rate, means for storing the sample data, and means for asynchronously sending such stored sample data over a communication line. The encoding sampling rate is not predetermined or necessarily constant and the encoding rate used is not communicated to, controlled by or known by the decoder at the receiving station.

At one or more receiving stations, there is provided a buffer for storing the asynchronously received sample data until used by a periodic decoder to reconstruct the waveform. Monitoring means observe the number of samples stored in the buffer and in turn adjust the rate at which the periodic decoder uses samples in a direction which will tend to restore the number of stored samples toward an equilibrium number. Therefore, if the encoder gradually changes its periodic encoding rate, the decoder will eventually detect the changing average rate at which samples are being received and stored and adjust its decoding rate accordingly. System parameters are designed so that the encoding rate and the decoding rate will not become widely disparate. This technique of deriving a decoding rate that is completely independent of the original encoding rate is termed and hereinafter refer to as "asynchronous sampling." The disclosed method and system achieves asynchronous sampling without thereby appreciably distorting the conveyed waveform.

It is to be understood that, as used herein, the term "asynchronous" refers to the lack of synchronism between two events. For purposes of this invention the term is used to refer to the lack of identity between two rates that are related to each other but separated in time. Since the term is used to refer to two different sets of related rates, it is important to distinguish between them.

It is also to be understood that, as used herein, the term "asynchronous sample data communication sytem" refers to the transmission technique where prepared samples or characters are not generally transmitted instantaneously but instead are stored for later transmission. Likewise received samples are not generally converted immediately into a waveform but instead are stored for later conversion into a reconstructed waveform. Such systems are sometimes called the "store and forward" type. The word "asynchronous " in this context refers to the time relation or actually the lack of time relation between the generation of sample data and the transmission thereof, and to the lack of a direct time relation between the receiving of sample data and the use thereof in reconstructing a waveform. The time relation between the generation of sample data and the use thereof in reconstructing a waveform should be distinguished from the above asynchronous operations because in conventional asynchronous sample data communication systems, rate of generation and the time delayed rate of use of sample data in reconstruction are identical or in other words synchronized.

It is also to be understood that as used herein, the term "asynchronous sampling" refers to the above mentioned time relation between generation of sample data and the use thereof in reconstructing a waveform, namely, that such relation is asynchronous meaning the rate of generation and rate of use are not maintained identical, time delayed or otherwise.

Since this invention may be advantageously employed in connection with virtually any store and forward or non-instantaneous sample data communication system, a functional description of the components of such systems is sufficient to appreciate and understand this invention.

BRIEF DESCRIPTION OF THE DRAWINGS

FIG. 1 is a functional block diagram of the sending and receiving portions of stations connected in a conventional asynchronous sample data communication system, illustrative of the prior art;

FIG. 2 is a functional block diagram of an asynchronous sample data communication system which incorporates control circuitry providing for asynchronous sampling and reconstruction of analog or voice waveforms, illustrative of the present invention.

DESCRIPTION OF THE PREFERRED EMBODIMENTS

Figure 3:
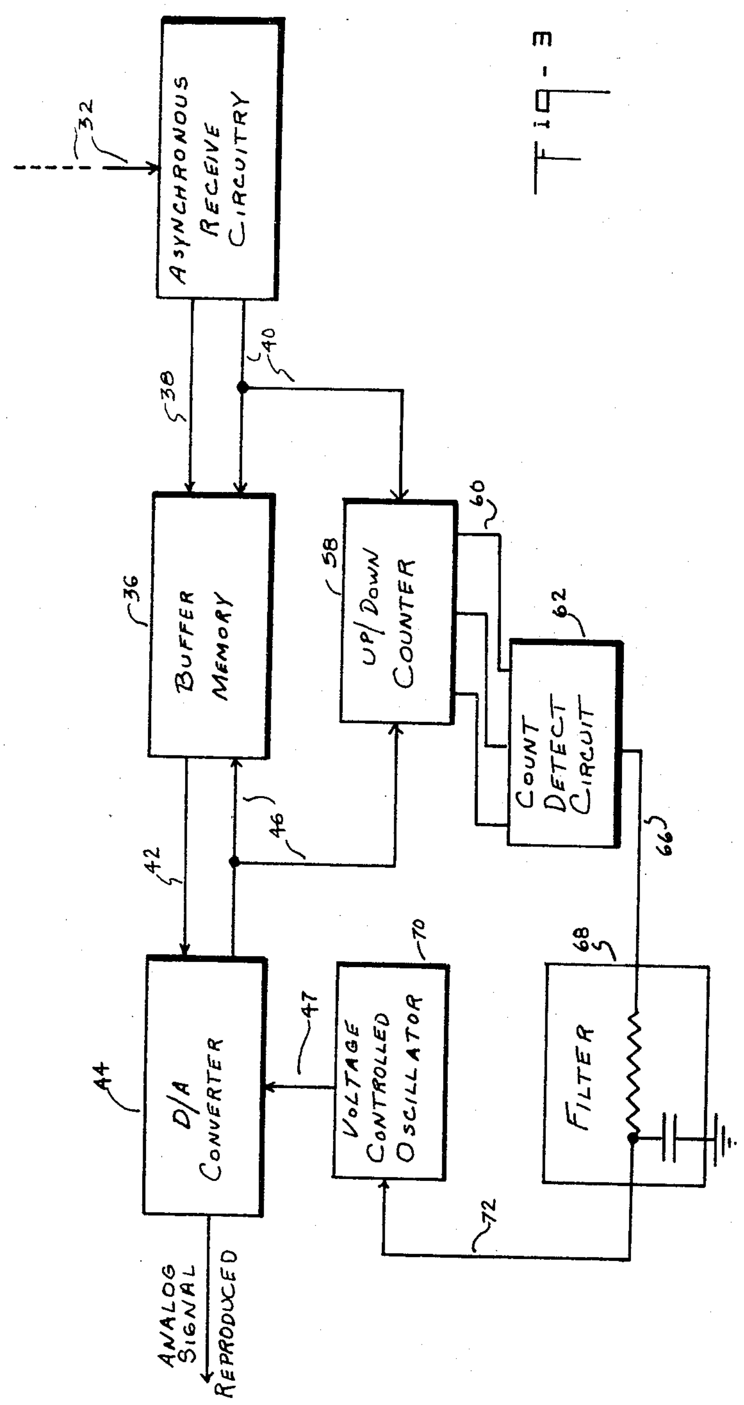
FIG. 3 is a schematic representation of the system shown in FIG. 2, showing further details of the control circuitry.

Referring now to the drawings, FIG. 1 is a simplified functional block diagram of the sending portion of one station and the receiving portion of another station in a conventional asynchronous sample data communication system. An analog-to-digital converter 14 monitors an input analog or voice waveform on line 16. Each time a triggering signal is detected on incoming line 18, A/D converter 14 codes the value of one or more characteristics of the analog waveform (usually the instantaneous value of the amplitude thereof), presents the coded "sample" (hereinafter called a character) on line or lines 20 to buffer memory 22, and signals on line 24 that a valid character is being presented on line(s) 20. Buffer 22 stores the character presented on line(s) 20 each time it detects the valid character signal on line 24. Buffer 22 maintains the order in which characters were received from converter 14 and presents the oldest or "first-in" character or block of characters to asynchronous transmit circuitry 26 along line(s) 28. When the presented character or block of characters has been transmitted, buffer 22 is signalled on line 30 to present the next oldest or succeeding character or block of characters (hereinafter the singular shall also be understood to include the plural).

A transmission network 32 carries transmitted characters to destination stations where asynchronous receive circuitry 34 detects and extracts the characters intended for that station and signals buffer memory 36 via line 38 each time a character has been received. Buffer memory 36 stores the character presented by asynchronous receive circuitry 34 on line(s) 40 each time it is signalled via line 38 to do so. Characters are stored in buffer memory 36 in sequential order, the oldest of first-in character being presented on line(s) 42 to a digital-to-analog converter 44. The D/A converter 44 uses the character presented on line(s) 42 when a triggering signal is detected on line 45, whereupon it signals buffer memory 36 via line 46 to present the next oldest or next-in character.

The A/D converter triggering signals on line 18 are received from the asynchronous transmit circuitry 26 and the D/A converter triggering signals on line 45 are received from the asynchronous receive circuitry 34. Circuitry 26 and circuitry 34 obtain the triggering signals or a common periodic base timing signal with which to synchronize the generation of such triggering signals from a common external source usually via transmission network 32. Consequently, the triggering signals are rate synchronized resulting in no net increase or decrease in the total number of characters stored or en route, which results in a constant time delay between the generation of a character and the use of that character.

FIG. 2 functionally shows the same system of FIG. 1, modified however by incorporating an embodiment of the present invention. Similarity of numbering is intentional to indicate functional similarity. Triggering signals for A/D converter 14 are here supplied by a conventional clock 48 via line 18. A buffer control system 50 at the receiver continuously monitors via line 52 the number of characters stored in buffer memory 36 and controls via line(s) 56 the rate at which clock 54 generates trigger signals on line 47 and thereby also the rate at which D/A converter 44 uses characters. Buffer control system 50 alters the clock rate in a direction that will tend to restore the number of characters in buffer memory 36 toward an equilibrium number.

As is apparent to one skilled in the control system art, the design of a control system depends upon the system characteristics and the result that is to be achieved. For example, the system of FIG. 2 shows a clock 48 establishing the encoding rate of A/D converter 14. It would be expected that differences in clock frequency resulting from drift and from differences in manufacture thereof would be small. Therefore the buffer control system 50 could be designed to compensate only for these variations by controlling the D/A converter 44 decoding rate only within the expected frequency range. On the other hand, if clock 48 is controlled itself by a manual or automatic system to achieve some desired result, control system 50 and clock 54 should be designed to track the expected frequency variations of clock 48 as would be apparent to one skilled in control system art.

FIG. 3 is a schematic representation of a control system. Up/down counter 58 detects the number of characters stored in buffer memory 36. The output voltage on line 60 of counter 58 increments a fixed amount each time buffer memory 36 is signalled on line 40 to store a character and decrements the same fixed amount each time buffer memory 36 is signalled on line 46 to present a new character to the D/A converter 44. The output of the up/down counter 58 is monitored by a count detect circuit 62 via up/down count output lines 60. The count detect circuit output 66 may be bivalued, that is either a logic 1 or logic 0 depending on whether the count is greater than or less than a chosen median value, or the output 66 may be multivalued determined by the present count and perhaps also by the count history or other factors. The output voltage on line 66 is then filtered through a lag type filter 68 which may or may not be linear and may or may not have a dead band. The simple RC network shown in Filter 68 would be suitable for many applications. The output voltage of filter 68 controls the frequency of voltage controlled oscillator 70 via line 72. As previously described, D/A converter 44 is triggered by the waveform on line 47 thus using characters from buffer 36 faster in response to a higher triggering frequency that results from an over-filled buffer 36. The higher rate at which D/A converter 44 uses characters tends to reduce the number of characters stored in buffer 36 back toward equilibrium fill.

The use of a lag filter is generally desirable so that abrupt changes in the number of characters stored in buffer 36 due to rapid transmission of a large number of characters previously stored in buffer 22 does not cause an equally abrupt change in the decoding rate and so that abrupt changes in output 66 do not cause abrupt changes in decoding rate. It is apparent also that the capacity of buffer 36 must be sufficient to accommodate such a burst of characters and that the equilibrium point for buffer 36 be such that it does not deplete when buffer 22 is accumulating characters that temporarily cannot be transmitted by the asynchronous transmission system. These requirements suggest that a suitable capacity for buffer 36 is twice that of buffer 22 and that at equilibrium buffer 36 be half filled. However, since buffer 36 can be emptied only at the rate demanded by D/A converter 44, characters will not be taken from buffer 36 in a burst. Therefore, a nonsymmetrical buffer control system with a less than half-fill equilibrium point and a buffer 36 having less than twice the capacity of buffer 22 would be possible and perhaps desirable. Design choice depends upon the system characteristics desired in relation to economic considerations.

Although the above description is directed to preferred embodiments of the invention, it is noted that other variations and modifications will be apparent to those skilled in the art and, therefore, may be made without departing from the spirit and scope of the present disclosure.

What is claimed is:

1. Method for reconstructing an analog or voice waveform in an asynchronous sample data communication system wherein there is no direct time relation between the generation of sample data and the transmission thereof and no direct time relation between the receiving of sample data and the use thereof in reconstructing a waveform, comprising:

at a sending station, generating sample data of said analog or voice waveform at a substantially periodic or constant rate;

storing said sample data;

sending said stored sample data over an asynchronous communication system in which time differentials exist between the sending of sequential samples to a receiving station;

at said receiving station, storing said sample data in a buffer;

extracting sample data from buffer storage for use by a periodic decoder;

monitoring said buffer to determine if the amount of stored sample data is above or below a predetermined equilibrium amount;

gradually varying the rate at which said periodic decoder uses samples by passing said monitoring information through a lag type filter after which it is used to smoothly vary the triggering rate of said decoder such that said amount of stored sample data tends toward said equilibrium amount; whereby the long term average encoding rate is continuously derived in the periodic decoder by providing a smooth, continuous decoding rate for reconstructing the analog or voice waveform.

2. Method as recited in claim 1, wherein the step of gradually varying the decoding rate includes:

gradually increasing said rate when the monitored amount of stored sample data is more than an equilibrium amount; and gradually decreasing said rate when the monitored amount of stored sample data is less than said equilibrium amount.

3. Method as recited in claim 1, wherein said generating of sample data of said analog or voice waveform is carried out at a substantially periodic rate which changes gradually.

4. Method as recited in claim 1, wherein the step of monitoring said buffer comprises continuously detecting whether the amount of sample data stored is either greater or less than said predetermined equilibrium amount.

5. Method as recited in claim 4, wherein said step of monitoring said buffer comprises counting the number of samples placed in storage and continuously subtracting one count from this number each time a sample is extracted from storage.

6. Method for sampling an analog or voice wave form at one of a plurality of stations in an asynchronous communication system and for reconstructing the waveform at another one of the stations, comprising:

at said one station, sampling said analog or voice waveform at a substantially uniform rate;

conveying said samples over said asynchronous communication system to said another station;

at said another station receiving and storing said conveyed samples, monitoring the amount of stored samples, and deriving the long term average encoding rate of said conveyed samples by a lag type filter connected to receive said monitoring information; and interpolating a waveform from said derived long term average encoding rate by varying the decoding rate of said stored samples in accordance with said derived long term average encoding rate; whereby said interpolated waveform approximates said sampled waveform without predetermining, centrally controlling or communicating the original sample rate.

7. Method as recited in claim 6, wherein said sampling of said waveform is carried out at a substantially uniform rate which changes gradually.

8. A sample data communication system wherein there is no direct time relation between the generation of sample data and the transmission thereof and no direct time relation between the receiving of sample data and the use thereof in reconstructing a waveform, comprising:

an encoder for generating sample data from an analog or voice waveform at a substantially uniform rate;

a buffer for storing said sample data;

means for sending said stored sample data over a transmission medium to a receiving station;

at said receiving station, a second buffer for storing said transferred sample data;

a decoder for taking sample data from said second buffer at a substantially uniform rate and reconstructing a waveform therefrom;

monitoring means for observing the amount of sample data in said second buffer relative to a predetermined equilibrium amount;

a lag type filter connected to the output of said monitoring means for gradually and smoothly varying said output so that abrupt changes in the amount of stored sample data may produce only gradual variations at the output of said lag type filter; and controlling means connected to said lag type filter and said decoder for gradually adjusting said rate at which said decoder reconstructs sample data in a direction that tends to bring the amount of said stored sample data toward said equilibrium amount; whereby said reconstructed waveform is formed by decoding said samples at a substantially uniform rate with gradual variations and approximates said sampled waveform without predetermining, centrally controlling or communicating the orignal sample rate.

9. A system as recited in claim 8 wherein said monitoring means includes:

an up/down counter connected to said second buffer for counting the difference between the amount of said sample data placed in said second buffer and the amount of said sample data taken from said second buffer, whereby the count is the amount of said stored sample data.

10. A system as recited in claim 9, wherein said controlling means gradually increases said decoding rate when said counter has a count above said equilibrium amount and gradually decreases said decoding rate when said counter has a count below said equilibrium amount, thereby tending to bring said count toward said equilibrium amount.

11. A system as recited in claim 10 wherein said lag type filter comprises a resistor-capacitor circuit to slowly vary said uniform rate of reconstruction.

12. A system as recited in claim 8 where said decoder comprises a D/A converter connected to and triggered by a voltage controlled oscillator.

* * * * *